Dec. 22, 1964                R. H. RILEY, JR., ETAL                3,161,954
            BLADE ASSEMBLY FOR PORTABLE POWER-OPERATED
                            HEDGE TRIMMER
                         Filed Nov. 14, 1962
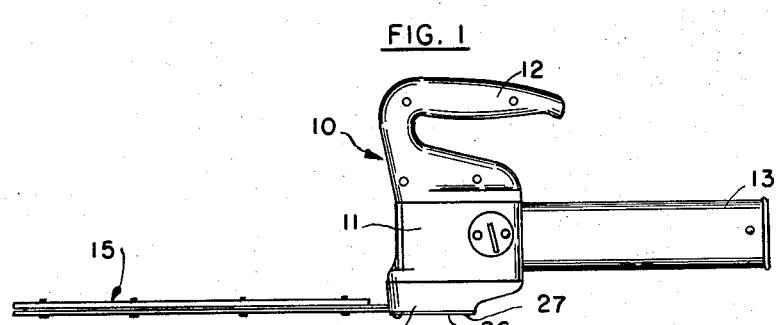
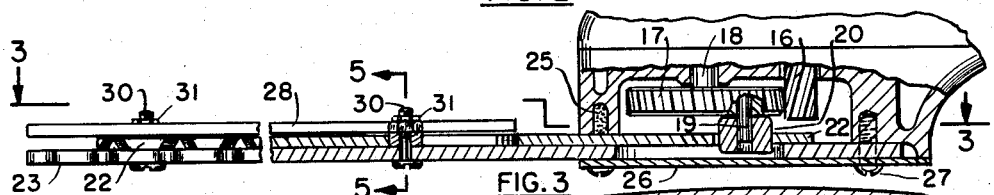
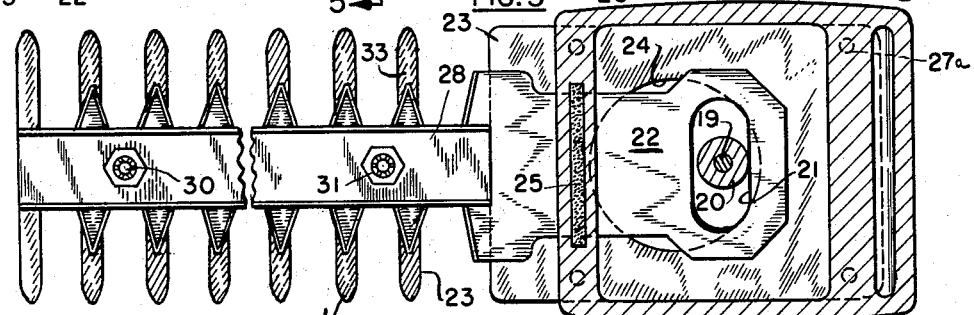
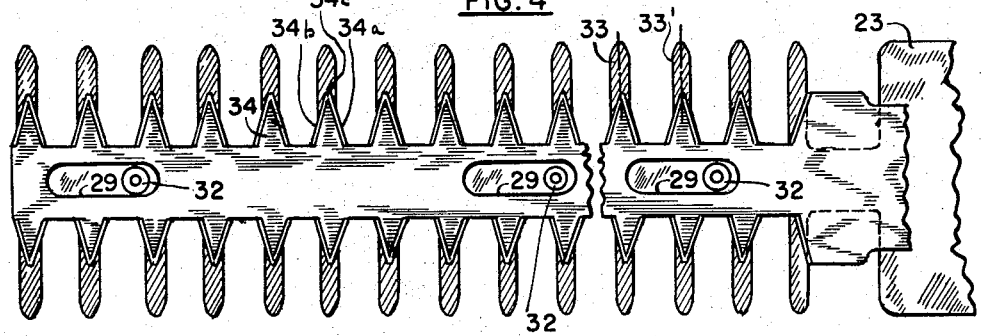
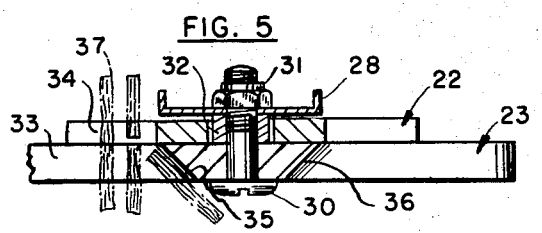
INVENTORS
ROBERT H. RILEY, JR.
HARRY L. BEAM
BY  *Leonard Bloom*
ATTORNEY

United States Patent Office 3,161,954
Patented Dec. 22, 1964

3,161,954
BLADE ASSEMBLY FOR PORTABLE POWER-
OPERATED HEDGE TRIMMER
Robert H. Riley, Jr., and Harry L. Beam, Towson, Md.,
assignors to Black and Decker Manufacturing Company, Towson, Md., a corporation of Maryland
Filed Nov. 14, 1962, Ser. No. 237,647
2 Claims. (Cl. 30—224)

The present invention relates to a blade assembly suitable for use in conjunction with a power-operated device for trimming hedges, pruning, cutting foliage and other growth; and more particularly, to a frictionless low-loss blade assembly for a portable power-operated hedge trimmer, wherein means are provided to accurately align the reciprocating blade longitudinally with respect to the stationary blade.

It is an object of the present invention to provide, for use in conjunction with a portable power-operated hedge trimmer, a blade assembly including at least one reciprocating blade, wherein the frictional forces restraining the reciprocating blade are reduced to a minimum.

It is another object of the present invention to provide a blade assembly which will allow the material already cut to be easily cleared, thereby providing less drag on the unit and rendering the unit much easier to operate.

It is yet another object of the present invention to provide a blade assembly that includes a blade cover plate, the purpose of which is to keep the moving blade from being clogged with dirt and debris, and simultaneously, to guide the moving blade and give it more rigidity.

It is a further object of the present invention to provide a blade assembly having a dry lubricant, one which resists the build-up of dirt on the blades, so as to result in relatively-low frictional losses.

It is a still further object of the present invention to provide a blade assembly that will cut the hedges or other foliage cleanly and evenly and will not tend to chew up the material being cut.

It is a still further object of the present invention to provide a blade assembly that is easy and economical to produce, yet is reliable and durable for long trouble-free performance.

In accordance with the teachings of the present invention, there is disclosed herein a preferred specific embodiment of a blade assembly suitable for use in a portable power-operated hedge trimmer, wherein the blade assembly includes a stationary blade in combination with a movable blade disposed on top of the stationary blade and adapted to reciprocate with respect to it. The movable blade has a plurality of spaced-apart slots formed therein along a substantially-common longitudinal axis, and a blade cover plate, preferably in the form of a U-shaped channel, is disposed on top of the movable blade to keep the slots from being clogged and to provide better guidance and rigidity for the movable blade. Uniformly-shaped teeth are formed on each of the blades and extend laterally from at least one side of the blade cover plate. The stationary blade is secured to the blade cover plate by suitable fastening means, which extend through each of the slots in the movable blade; and preferably, the fastening means includes a respective spacer washer in each of the slots. The spacer washers have a vertical height or thickness slightly exceeding that of the movable blade, thereby guiding the movable blade between the stationary blade and the blade cover plate. The respective spacer washers in the two furthest removed slots have a diameter exceeding that of the other spacer washers and closely approaching the width of the respective slots, so as to position the movable blade with respect to the stationary blade. The teeth which are formed on the stationary blade are equally spaced with respect to each other and are relatively narrow when compared to the space between adjacent teeth, while the teeth which are formed on the movable blade, which is the cutting blade, are generally triangular in plan view and are formed with a pair of sharpened cutting edges that converge at the apex or tip of the cutting tooth. Preferably, the base portion of each tooth on the movable blade has a width, measured longitudinally of the blade, which exceeds the corresponding width of a tooth on the stationary blade; and the tip of each tooth on the movable blade terminates short of the full length of a respective tooth formed on the stationary blade. At the extreme rearward or retracted position of the movable blade, the tip of each tooth on the movable blade is approximately aligned with the center line of a corresponding tooth on the stationary blade; and at the extreme forward or advanced position of the movable blade, the tip of a respective tooth on the movable blade is approximately aligned with the center line of the next adjacent tooth on the stationary blade, so that the extent of reciprocation of the movable blade, that is to say, its length of stroke, is substantially equal to the width of a tooth on the stationary blade plus the space allotted between adjacent teeth on the stationary blade. Moreover, the space between adjacent teeth on the stationary blade has a beveled undercut, so that the twigs or other foliage, after being cut, will be easily cleared from the blade assembly; and this, in conjunction with the overall design of the blade assembly, provides a clean, smooth cut, one which does not chew up or otherwise mutilate the hedges being trimmed.

These and other objects of the present invention will become apparent from a reading of the following specification, taken in conjunction with the enclosed drawings, in which:

FIGURE 1 is a side elevational view of a typical portable electric hedge trimmer with which the teachings of the present invention may find more particular utility;

FIGURE 2 is a longitudinal section taken through a portion of the hedge trimmer illustrated in FIGURE 1, with the scale enlarged over that of FIGURE 1, showing the means for reciprocating the movable blade, and further showing the blade assembly being broken away intermediate its extremities for convenience of illustration, one portion of the blade assembly being in elevation and the other in section;

FIGURE 3 is a view taken along the lines 3—3 of FIGURE 2, showing the blade assembly in plan view in its extreme rearward or retracted position;

FIGURE 4 is a partial plan view of the blade assembly, the blade cover plate being removed for ease of understanding, and showing the reciprocating blade in its extreme forward or advanced position; and FIGURE 5 is a view taken along the lines 5—5 of FIGURE 2, showing the means for securing the blade cover plate to the stationary blade.

With respect to FIGURE 1, there is illustrated a portable power-operated hedge trimmer 10, which preferably, but not necessarily, comprises a cordless electric hedge trimmer such as is described and illustrated in the co-pending Riley et al. application S.N. 184,904, filed April 3, 1962, entitled "Cordless Electric Hedge Trimmer Assembly," and assigned to the same assignee as that of the present invention. However, it will be appreciated that the teachings of the present invention are equally applicable to a variety of power-operated hedge trimmers, foliage cutters, pruning devices, and related articles, and that the specific illustration herein of the cordless electric hedge trimmer is merely for convenience of illustration. With this in mind, the hedge trimmer 10 comprises a motor housing 11, an overhead handle 12 secured to the motor housing 11, a rear housing 13 utilized as an additional handle and housing a removable power pack or battery pack (not shown), a gear case 14 secured below the motor housing 11, and a blade assembly, designated generally as at 15, housed at one end in the gear case 14, and projecting forwardly of the motor housing 11.

With reference to FIGURE 2 and 3, the motor housing 11 houses a direct current high-efficiency electric motor (not shown) which includes an armature shaft having a pinion 16 formed thereon. The pinion 16 projects within the gear case 14 and meshes with a gear 17. The gear 17 is journaled upon a spindle 18 and carries an eccentric or crank pin 19 having a roller 20 thereon. The roller 20 is guided within a transverse track (or yoke) 21 formed integrally within a movable or reciprocating blade 22. It will be appreciated that this is the conventional Scotch-yoke type of motion-translation mechanism utilized to convert the rotary motion of the electric motor and its associated shaft to the longitudinal reciprocation of the movable blade 22. The movable blade 22 is disposed on top of a stationary blade 23 which has a circular aperture 24 formed therein to provide a clearance for the roller 20. A felt strip 25 is preferably retained within the gear case 14 so as to provide a seal against grease escaping from the gear case 14, and also, against dirt or soil entering within the gear case 14. Moreover, a suitable cover 26 may be secured beneath the gear case 14 by screws 27 which pass through holes 27a (see FIGURE 3) formed in the stationary blade 23.

With reference again to FIGURES 2 and 3, and with further reference to FIGURES 4 and 5, a blade cover plate 28, which preferably has a U-shaped or channel-shaped cross-section for greater rigidity, is disposed on top of the reciprocating blade 22 and is secured to the stationary blade 23. A plurality of space-apart slots 29, preferably a total of four, are formed in the movable blade 22 along a substantially-common longitudinal axis. A screw 30 passes up through each of the slots 29 formed in the movable blade 22, and a nut 31 is carried by each of the screws 30 so as to retain the blade cover plate 28 to the stationary blade 23. A spacer washer 32 is received in each of the slots 29 between the stationary blade 23 and the blade cover plate 28. Each of the spacer washers 32 has a thickness or vertical height slightly exceeding that of the movable blade 22, see FIGURE 5, such that the movable blade 22 (as it is being reciprocated) will be retained between the stationary blade 23 and the blade cover plate 28. Moreover, the spacer washers 32 which are received within the two outermost slots 29 (see FIGURE 4) are slightly larger in diameter than the corresponding spacer washers 32 which are received within the inner or intermediate slots 29, with the diameter of these two outermost spacer washers 32 closely approximating the width of the slots 29, thereby positioning the movable blade 22 with respect to the stationary blade 23. In FIGURE 4, it will be appreciated, that the differences in diameters between the spacer washers 32, as well as the clearances between the washers 32 and the slots 29, have been slightly exaggerated for clarity of understanding.

With reference again to FIGURES 3 and 4, the stationary blade 23 is provided with a plurality of uniformly-shaped teeth on each side thereof; and the movable blade 22, which is the cutting blade, is formed with uniformly-shaped cutting teeth on each side thereof. The teeth of both blades extend laterally from the respective sides of the blade cover plate 28, thus making the blade assembly 15 "double edged" so that the hedge trimmer 10 may cut back-and-forth in a laterally sweeping movement. Moreover, the teeth on the stationary blade 23, one of which is designated as at 33, are relatively narrow when compared to the space allotted between adjacent teeth on the stationary blade 23. The cutting teeth on the movable blade 22, one of which is designated as at 34, are generally triangular in plan view (see FIGURES 3 and 4) and have cutting edges 34a and 34b formed thereon which converge at the apex or tip 34c. Each tooth 34 on the movable blade 22 has a width (measured along the base of the triangle) which is wider than the corresponding width of each tooth 33 formed on the stationary blade 23. Moreover, each tooth 34 on the movable blade 22 is shorter (measured transversely of its base) than the corresponding length of each tooth 33 on the stationary blade 23. Furthermore, at the extreme rearward or retracted position of the movable blade 22, see FIGURE 3, the tip 34c of each tooth 34 on the movable blade 22 is approximately aligned with the center line of a respective corresponding tooth 33 formed on the stationary blade 23; and at the opposite "dead center" position, that is to say, at the extreme forward or advanced position of the movable blade 22, see FIGURE 4, the tip 34c is approximately aligned with the center line of the next adjacent tooth 33' of the stationary blade 23. Consequently, it will be appreciated that the extent of reciprocation or "stroke" of the movable blade 22 is such that each tooth 34 formed thereon (and any particular point on each of the teeth 34) traverses a longitudinal distance approximately equal to the width of one of the teeth 33 on the stationary blade 23 plus the distance (measured longitudinally) between two adjacent teeth, 33 and 33', on the stationary blade 23.

With reference again to FIGURE 5, the stationary blade 23 has a pair of beveled undercuts 35 and 36 formed thereon in the spaces between the adjacent teeth 34; and this allows the material being cut, such as the twig 37, to easily clear the blade assembly 15.

In the manufacture of the blade assembly 15 for the cordless electric hedge trimmer 10, the stationary blade 23 is preferably of a good quality carbon "spring" steel which has a relatively-hard chromium plate formed thereon. The movable blade 22 is also of good quality carbon "spring" steel and is preferably cadmium-plated all over, while the blade cover plate 26 is also cadmium-plated all over. Accordingly, the continuous rubbing between surfaces of dissimilar metals, one of which (chromium) is relatively-hard, and the other of which (cadmium) is relatively-soft, provides a relatively frictionless surface with superior wearing qualities, one which provides less "drag" on the motor for the hedge trimmer 10. Moreover, the movable blade 22, which has cutting edges 34a and 34b formed on each of its teeth, will require a resharpening from time-to-time; and after such resharpening, the cadmium plating on the movable blade 22 (being of a less "noble" metal than the steel upon which it is deposited) will tend to be given up or "lost" in any electrolytic action generated as a result of moisture or dampness collecting on the blade assembly 15, thereby insuring that the steel "core" of the movable blade 22 will be protected at all times. The combination of a chromium plating on the stationary blade 23 and a cadmium plating on the movable blade 22, results in a relatively frictionless low-loss operation, and simultaneously, in a protection against rust or corrosion.

Furthermore, the top surface of the stationary blade 23, as well as both sides of the movable blade 22 and the underside of the blade cover plate 26, are preferably sprayed with a dry lubricant which may comprise a fluorocarbon telomer dispersion such as is manufactured by E. I. du Pont de Nemours and Co. under the trademark "Slip Spray." This dry lubricant, which resists a build up of dirt otherwise associated with grease or oils, has been found to further enhance the smooth and frictionless operation of the blade assembly 15 in the hedge trimmer 10.

Obviously, many modifications may be made without departing from the basic spirit of the present invention; and accordingly, within the scope of the appended claims, the invention may be practiced other than has been specifically described.

We claim:
1. A blade assembly for a portable power-operated hedge trimmer, comprising:
   (a) a stationary blade;
   (b) a movable blade disposed on top of said stationary blade and adapted to reciprocate with respect to it;
   (c) a plurality of spaced-apart slots formed in said movable blade along a substantially common longitudinal axis;
   (d) a blade cover plate disposed on top of said movable blade and covering said slots;
   (e) teeth formed on each of said blades and extending laterally from at least one side of said cover plate, the teeth on said movable blade having cutting edges formed thereon;
   (f) fastening means between said stationary blade and said blade cover plate, extending through each of said slots in said movable blade, and including a respective spacer washer in each of said slots;
   (g) each of said spacer washers having a vertical height exceeding that of said movable blade; and
   (h) said respective spacer washers in the two furthest removed slots having a diameter exceeding that of the order of said spacer washers, and closely approaching the width of each slot, thereby positioning the movable blade with respect to said stationary blade.

2. A blade assembly as defined in claim 1, wherein:
   (a) said blade cover plate comprises a U-shaped channel.

References Cited by the Examiner
UNITED STATES PATENTS

| | | | |
|---|---|---|---|
| 715,838 | 12/02 | McCallum | 30—219 X |
| 1,693,707 | 12/28 | Dishmaker | 30—218 |
| 2,558,459 | 6/51 | Podner | 30—220 |
| 2,607,113 | 8/52 | James | 30—220 |
| 2,630,628 | 3/53 | Hall | 30—220 X |
| 2,756,500 | 7/56 | Green | 30—224 X |
| 2,964,845 | 12/60 | Dooling | 30—216 |
| 3,083,457 | 4/63 | Ottosen et al. | 30—216 |

WILLIAM FELDMAN, *Primary Examiner.*

MILTON MEHR, *Examiner.*